R. S. XENAKY.
STEAM MOTOR AND ELECTRICAL GENERATOR COMBINED EFFICIENCY INDICATOR.
APPLICATION FILED AUG. 1, 1914.
1,194,807. Patented Aug. 15, 1916.
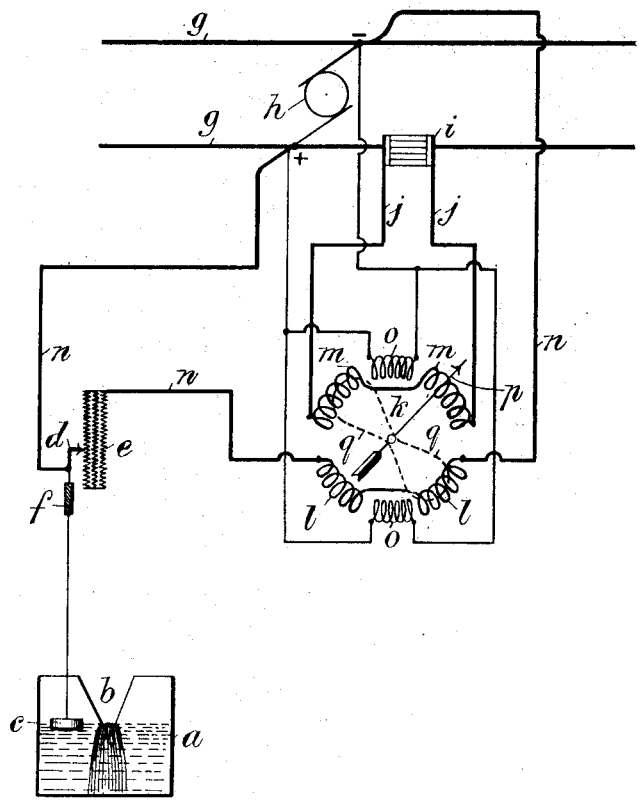
Witnesses:
John C. Sanders
Albert F. Neuman
Inventor
Reginald Solon Xenaky
By
M. McLau...
Atty

UNITED STATES PATENT OFFICE.

REGINALD SOLON XENAKY, OF BIRMINGHAM, ENGLAND, ASSIGNOR OF ONE-HALF TO FRANK GILMAN, OF BIRMINGHAM, ENGLAND.

STEAM-MOTOR AND ELECTRICAL-GENERATOR COMBINED-EFFICIENCY INDICATOR.

1,194,807.     Specification of Letters Patent.     Patented Aug. 15, 1916.

Application filed August 1, 1914. Serial No. 854,530.

*To all whom it may concern:*

Be it known that I, REGINALD SOLON XENAKY, a subject of His Majesty the King of Great Britain and Ireland, residing at 68 Lightwoods Hill, Birmingham, in the county of Warwick, England, have invented certain new and useful Improvements in Steam - Motor and Electrical - Generator Combined - Efficiency Indicators, of which the following is a specification.

The object of this invention is to provide an apparatus which will automatically indicate and if necessary record the combined efficiency of any combined set of a condensing steam engine, or steam turbine or any other type of steam motor coupled with any type of electrical generator, and thus obviate the necessity of making the usual tests.

My invention will be described in conjunction with the accompanying drawings which diagrammatically set out the preferred arrangement of my invention.

An ordinary measuring weir $a$ is provided in the air pump discharge so as to measure the steam consumption in known manner by the water discharged passing through a notch $b$ in the weir. In the water at the back of the weir I provide a float $c$ which is connected to and actuates a moving arm or brush $d$ which moves over a rheostat $e$ the resistance of the rheostat being relative to a curve indicating the quantity of water flowing over the particular type of weir employed, that is to say, the determined resistance is in inverse ratio to the water passing over the weir. In the connection between the moving arm or brush $d$ and the float $c$ is an insulating block $f$ for the purpose of maintaining the circuit through the rheostat $e$. In circuit with the mains $g$ of the generator $h$ there is a shunt $i$ for shunting by means of the wires $j$, a determined quantity of the current through a special combined form of watt meter or the like $k$ hereinafter described; said meter forming part of this invention. The meter $k$ consists of the combination of two meters $l$, $m$, each of known form, placed to give a torque in opposition to each other, the meter $l$ deriving its current from the generator through the variable resistance circuit $n$, and the meter $m$, deriving its current from the shunt circuit $j$. The voltage coils $o$ in circuit with the generator are for the known purpose of imparting an increased or diminished voltage torque in ratio to the voltage in the circuit. The combined meter $k$ has an index finger or pointer $p$, the armature or vanes $q$ of the said finger being controlled in known manner by means of the moving coils of the meters $l$, $m$, as will be seen upon reference to the diagram.

The operation of my apparatus is as follows: Assuming it to be possible (which it is not) for the combined engine and generator to show a constant amount of steam per unit generated for all loads, then it would follow that whatever position the float $c$ took the current passing through the rheostat $e$ would give a torque to the moving coils of the meter $l$ equal to the torque shown by the moving coils of the meter $m$, and consequently the index finger $p$ would take up a set position for all loads. As however it is not possible for the combined engine and generator to show a constant amount of steam per unit generated for all loads, it follows that if the steam consumption be increased not in proportion to the load, then more resistance would be cut out by the variable contact of the moving arm or brush $d$ with the rheostat $e$ and more current would pass through the meter $l$. This would give an increased torque to the moving coils of the meter $l$ and the index $p$ secured to the armature $q$ would be deflected to show an increased steam consumption per electric unit generated; or vice versa, should the steam consumption fall then the current passing through the meter $l$ would be less than the current passing through the coils of the meter $m$, consequently the torque of the moving coils of the meter $l$ would be less and thus indicate by the deflection of the index $p$ an increased efficiency, that is a reduced steam consumption per electric unit generated.

Referring now more particularly to the combined watt meter or the like $k$ this embodies the known principle of a moving coil or coils, but other types of electric indicating meter, can be employed. In the meter as shown in the diagram I employ two series of moving coils which are opposed to each other the coils of the meter $l$ deriving their current through the resistance circuit $n$ and the coils of the meter $m$ deriving their current through the shunt circuit $j$. The armature or vanes $q$ oscillates between and is influenced by the opposed coils of the meters $l$, $m$. Each of these meters $l$, $m$, is composed of a voltage coil and a current coil connected in the ordinary manner as in the known forms of watt meters.

What I claim as my invention and desire to secure by Letters Patent is:—

1. An apparatus for automatically indicating the combined efficiency of a condensing steam engine or the like and an electrical generator, comprising in combination a watt meter having an index hand and opposed sets of coils, means whereby one set of coils is in circuit with the generator through a variable resistance, a weir over which the air pump of the engine discharges, means for controlling said resistance according to the amount of water passing over said weir, means whereby the other set of coils is maintained in a shunt circuit of the electrical generator, the arrangement being such that any variation between the two sets of coils forming the combined watt meter is indicated by the deflection of said index.

2. An apparatus for automatically indicating the combined efficiency of a condensing steam engine, or the like, and an electrical generator comprising in combination with a watt meter having opposed coils, a weir located in the air pump discharge of the steam engine, a float in said weir, a rheostat, a brush therefor, means whereby said float controls the movements of said brush against said rheostat, means whereby said rheostat is maintained in circuit with the electrical generator and with one series of coils of said meter in combination with the opposed series of coils of said electric meter located in a shunt circuit from said generator, the two series of opposed coils of said meter being arranged to form an indicating watt meter.

In testimony whereof I affix my signature in presence of two witnesses.

REGINALD SOLON XENAKY.

Witnesses:
GEORGE E. FOLKES,
BERTHA M. DEELEY.